United States Patent Office 3,055,914
Patented Sept. 25, 1962

3,055,914
5,5'-(OXYDIMETHYLENE)BIS-TETRAHYDRO-FURFURYLAMINE
John D. Garber, Westfield, and Robert E. Jones, Rahway, N.J., assignors to Merck & Co., Inc., Rahway, N.J., a corporation of New Jersey
No Drawing. Original application Aug. 9, 1957, Ser. No. 677,196, now Patent No. 2,995,581, dated Aug. 8, 1961. Divided and this application Jan. 27, 1961, Ser. No. 85,192
1 Claim. (Cl. 260—347.7)

This invention relates to organic compounds derived from 5-hydroxymethyl furfural, and has for its object the provision of a class of ethers of 5-hydroxymethyl furfural represented by the formula:

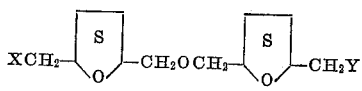

wherein X and Y each represent the same radical of the group consisting of —OH, —Cl, —NH$_2$ and —O$_2$CR where R represents hydrogen or alkyl, and a process of producing the compounds.

This application is a division of our copending application No. 677,196, filed August 9, 1957, now U.S. Patent No. 2,995,581.

The glycol (X=Y=—OH) is useful as a high boiling solvent and humectant. Loss due to evaporation, as compared to glycerol, diethylene glycol and other materials, is very low.

The glycol diesters (X=Y=—O$_2$CR) are compatible with polyvinyl chloride and, hence, are useful as plasticizers. The diacetate is a particularly potent solvent for polyvinyl chloride and will cause rapid swelling and eventual solution as a gel at room temperature.

The diamine (X=Y=—NH$_2$) is useful as an epoxy resin curing agent and has certain advantages over other amines, i.e., it is a liquid, reasonably non-irritating and gives a rapid cure at 60–150° C. with good pot life at lower temperatures.

In preparing the compounds of the invention, 5-hydroxymethyl furfural

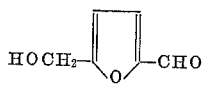

hereinafter called HMF, may be used as it is a conveniently available starting material for preparing the ether. The ether of HMF

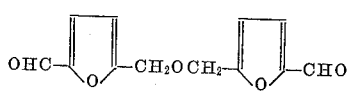

is formed by splitting one mol of water from two mols of HMF. The HMF ether may also be formed from the residues that result from the distillation of HMF, as produced in the high temperature cracking of sugars.

The stable saturated glycol ether

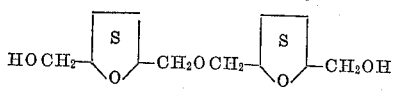

is formed by the hydrogenation of the HMF ether as follows

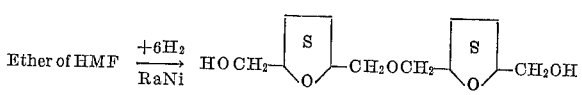

This glycol is a viscous, water-white material of very high boiling point (155°/30 microns:360° C./760 mm.) and seems to be formed in quantative yield. Acetylation of the glycol gives a high yield of analytically pure diacetate, a high boiling ester of potent solvent power

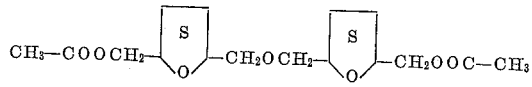

Using the technique of Newth and Wiggins (J. Chem. Soc., 155 (1948)), who converted 2,5-dimethylol tetrahydrofuran to the dihalide, the above glycol was converted to oxy bis-(5-methylene-2-chloromethyltetrahydrofuran).

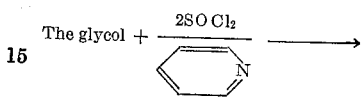

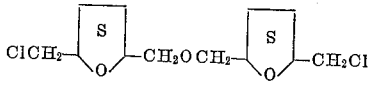

By reductive amination of the dialdehyde the diamine is formed thus:

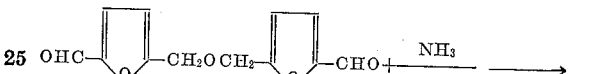

This diamine is a high boiling base and is an effective cross-linking agent for epoxy resins, giving light colored resins, and is an intermediate in forming polyamides.

The following examples illustrate processes for the preparation of compounds of the invention.

EXAMPLE I

*Preparation of Glycol*

(X=Y=—OH)

To one mole of the so-called HMF ether

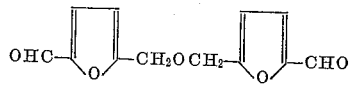

dissolved in 5–10 volumes of methanol was added 10% Raney nickel catalyst, based on HMF ether. Hydrogenation was effected at 160° C., 2000 p.s.i.g. for 3–4 hours. The theoretical amount of hydrogen, 6 mols, was consumed. After removal of catalyst and solvent, distillation of the residue gave 76% of theory of analytically pure glycol (X=Y=—OH). This new compond is a water white, viscous liquid, B.P. 157–159° C. at 30 microns, $n_D^{25}$=1.4878.

EXAMPLE II

A repeat run was made of Example I except that the filtered reaction mixture was heated under vacuum until all solvent was removed, i.e., to constant weight. The residue was practically water white and represented a 100% yield of glycol. The refractive index compared well with that of the analytically pure sample; $n_D^{25}$=1.4873. Tests for the presence of an aldehyde group were negative.

EXAMPLE III

*Preparation of Glycol Diester*

(X=Y=—O$_2$CCH$_3$)

The glycol described in Example II was converted to the diacetate by refluxing with excess acetic anhydride in acetic acid. After distillation, the yield of water-white diacetate, analytically pure, was 93.6%. This substance is not as viscous as the parent compound and shows B.P.=158–160° C. at 40 microns, $n_D^{25}$=1.4651.

EXAMPLE IV

*Preparation of Diester*

$(X=Y=O_2CC_7H_{15})$

Reaction of the above saturated glycol of Example II with a slight excess (1:2 mol ratio) of 2-ethylhexoyl chloride produced a viscous, water-white product in 98.5% yield, $n_D^{25}$=1.4598. Due to its high boiling point, this diester could not be readily distilled; however, the above "crude" showed reasonably good analyses.

Calculated for $C_{28}H_{50}O_7$: C=67.40%, H=10.11%. Found: C=68.24%, H=9.89%.

EXAMPLE V

*Preparation of Dihalide*

$(X=Y=-Cl)$

Using a procedure reported by Newth and Wiggins (J. Chem. Soc. (1948), 155) for another compound, the glycol described in Example I was converted to the dichloro compound with thionyl chloride. Anhydrous HCl also was effective.

Analytically pure material was obtained in 50% yield, B.P.=135–137° C. at 0.8 mm., $n_D^{25}$=1.4879.

EXAMPLE VI

*Preparation of Diamine*

$(X=Y=-NH_2)$

HMF ether was converted to the dioxime in quantitative yield and reduced at 150° C. using 2000 p.s.i.g. hydrogen and Raney nickel. The yield of the desired diamine was only 37%.

However, when reduction of the dioxime was carried out in the presence of 5–10 mols of liquid ammonia (per mol of dioxime), the yield of diamine was 60–80%. The physical constants of the analytically pure diamine are as follows: B.P.—139–141° C. at 0.3 mm., $n_D^{25}$=1.4901.

Reductive amination of HMF ether using Raney nickel, hydrogen and ammonia also produced the same diamine as illustrated in the following example:

EXAMPLE VII

A mixture of 25.0 g. (0.106 M.) of the ether of HMF in 200 ml. of absolute methanol was cooled and 50 ml. of liquid ammonia added. After addition of 1 teaspoon of Raney nickel, the run was closed in a high pressure hydrogenation bomb (glass linen) and heated at 150° C. and 5000–6000 p.s.i. of hydrogen for 20 hours. The ammonia and methanol were removed under reduced pressure after filtration of the catalyst, leaving nearly water-white crude diamine. This may be used without further purification for certain resinifications. Distillation gave 14.4 g. of analytically pure material, $n_D^{25}$=1.4901, B.P. 139–141° C. at 0.3 mm.

Calculated for $C_{12}H_{24}N_2O_3$: C, 58.99; H, 9.90; N, 11.47. Found: C, 59.17; H, 9.57; N, 11.35.

We claim:
The compound represented by the formula

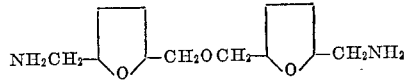

References Cited in the file of this patent

Robinson et al.: Organic Synthesis, vol. 23 (1943), page 70.

Dunlop: The Furans (1953), pages 235, 707.